United States Patent
Papasakellariou

(10) Patent No.: US 8,213,367 B2
(45) Date of Patent: Jul. 3, 2012

(54) METHODS FOR DIMENSIONING THE CONTROL CHANNEL FOR TRANSMISSION EFFICIENCY IN COMMUNICATION SYSTEMS

(75) Inventor: Aris Papasakellariou, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 796 days.

(21) Appl. No.: 11/554,467

(22) Filed: Oct. 30, 2006

(65) Prior Publication Data

US 2007/0097915 A1 May 3, 2007

Related U.S. Application Data

(60) Provisional application No. 60/805,148, filed on Jun. 19, 2006, provisional application No. 60/746,450, filed on May 4, 2006, provisional application No. 60/732,868, filed on Nov. 2, 2005.

(51) Int. Cl.
*H04W 4/00* (2009.01)

(52) U.S. Cl. .................................................. 370/329
(58) Field of Classification Search .................. 370/204, 370/437; 455/23; 375/260
See application file for complete search history.

(56) References Cited

U.S. PATENT DOCUMENTS

| | | | |
|---|---|---|---|
| 2003/0123470 A1* | 7/2003 | Kim et al. | 370/437 |
| 2005/0107036 A1* | 5/2005 | Song et al. | 455/23 |
| 2005/0238108 A1* | 10/2005 | Suh et al. | 375/260 |

* cited by examiner

*Primary Examiner* — Albert T Chou
(74) *Attorney, Agent, or Firm* — Ronald O. Neerings; Wade James Brady, III; Frederick J. Telecky, Jr.

(57) ABSTRACT

Embodiments of the invention provide methods for optimizing the spectral efficiency of control channel transmissions carrying scheduling assignments from a serving Node B to user equipments. This is accomplished by adjusting the control channel size between successive transmission time intervals according to the number of user equipments having scheduling assignments and possibly according to the modulation and coding scheme used for the transmission of each scheduling assignments.

17 Claims, 6 Drawing Sheets

METHODS FOR DIMENSIONING THE CONTROL CHANNEL FOR TRANSMISSION EFFICIENCY IN COMMUNICATION SYSTEMS

CROSS-REFERENCE TO RELATED APPLICATIONS

This application claims priority to and incorporates by reference U.S. Provisional Application Nos.: 60/732,868, filed Nov. 2, 2005; 60/746,450 filed May 4, 2006; and 60/805,148 filed Jun. 19, 2006.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Embodiments of the invention are directed, in general, to communication systems and, more specifically, to dimensioning control channels and optimizing the spectral efficiency of their transmission in the downlink of a communication system.

The global market for both voice and data communication services continues to grow as does use of the systems which deliver such services. As communication systems evolve, system design has become increasingly demanding in relation to equipment and performance requirements. Future generations of communication systems, will be required to provide high quality high transmission rate data services in addition to high quality voice services. Orthogonal Frequency Division Multiplexing (OFDM) is a technique that will allow for high speed voice and data communication services.

Orthogonal Frequency Division Multiplexing (OFDM) is based on the well-known technique of Frequency Division Multiplexing (FDM). OFDM technique relies on the orthogonality properties of the fast Fourier transform (FFT) and the inverse fast Fourier transform (IFFT) to eliminate interference between carriers. At the transmitter, the precise setting of the carrier frequencies is performed by the IFFT. The data is encoded into constellation points by multiple (one for each carrier) constellation encoders. The complex values of the constellation encoder outputs are the inputs to the IFFT. For wireless transmission, the outputs of the IFFT are converted to an analog waveform, up-converted to a radio frequency, amplified, and transmitted. At the receiver, the reverse process is performed. The received signal (input signal) is amplified, down converted to a band suitable for analog to digital conversion, digitized, and processed by a FFT to recover the carriers. The multiple carriers are then demodulated in multiple constellation decoders (one for each carrier), recovering the original data. Since an IFFT is used to combine the carriers at the transmitter and a corresponding FFT is used to separate the carriers at the receiver, the process has potentially zero inter-carrier interference such as when the sub-carriers are separated in frequency by an amount larger than the maximum expected Doppler shift.

FIG. 1 is a diagram illustrative of the Frequency 103-Time 101 Representation 100 of an OFDM Signal. In FDM different streams of information are mapped onto separate parallel frequency channels 140. Each FDM channel is separated from the others by a frequency guard band to reduce interference between adjacent channels.

The OFDM technique differs from traditional FDM in the following interrelated ways:
1. multiple carriers (called sub-carriers 150) carry the information stream;
2. the sub-carriers 150 are orthogonal to each other; and
3. a Cyclic Prefix (CP) 110 (also known as guard interval) is added to each symbol 120 to combat the channel delay spread and avoid OFDM inter-symbol interference (ISI).

The data/information carried by each sub-carrier 150 may be user data of many forms, including text, voice, video, and the like. In addition, the data includes control data, a particular type of which is discussed below. As a result of the orthogonality, ideally each receiving element tuned to a given sub-carrier does not perceive any of the signals communicated at any other of the sub-carriers. Given this aspect, various benefits arise. For example, OFDM is able to use orthogonal sub-carriers and, as a result, thorough use is made of the overall OFDM spectrum. As another example, in many wireless systems, the same transmitted signal arrives at the receiver at different times having traveled different lengths due to reflections in the channel between the transmitter and receiver. Each different arrival of the same originally-transmitted signal is typically referred to as a multi-path. Typically, multi-paths interfere with one another, which is sometimes referred to as InterSymbol Interference (ISI) because each path includes transmitted data referred to as symbols. Nonetheless, the orthogonality implemented by OFDM with a CP considerably reduces or eliminates ISI and, as a result, a less complex receiver structure, such as one without an equalizer (one-tap "equalizer" is used), may be implemented in an OFDM system.

The Cyclic Prefix (CP) (also referred to as guard interval) is added to each symbol to combat the channel delay spread and avoid ISI. FIG. 2 is a diagram illustrative of using CP to eliminate ISI and perform frequency domain equalization. Blocks 200 each comprising cyclic prefix (CP) 210 coupled to data symbols 220 to perform frequency domain equalization. OFDM typically allows the application of simple, 1-tap, frequency domain equalization (FDE) through the use of a CP 210 at every FFT processing block 200 to suppress multi-path interference. Two blocks are shown for drawing convenience. CP 210 eliminates inter-data-block interference and multi-access interference using Frequency Division Multiple Access (FDMA).

Since orthogonality is typically guaranteed between overlapping sub-carriers and between consecutive OFDM symbols in the presence of time/frequency dispersive channels, the data symbol density in the time-frequency plane can be maximized and high data rates can be very efficiently achieved for high Signal-to-Interference and Noise Ratios (SINR).

FIG. 3 is a diagram illustrative of CP Insertion. A number of samples are typically inserted between useful OFDM symbols 320 (guard interval) to combat OFDM ISI induced by channel dispersion, assist receiver synchronization, and aid spectral shaping. The guard interval 310 is typically a prefix that is inserted 350 at the beginning of the useful OFDM symbol (OFDM symbol without the CP) 320. The CP duration 315 should be sufficient to cover most of the delay-spread energy of a radio channel impulse response. It should also be as small as possible since it represents overhead and reduces OFDM efficiency. Prefix 310 is generated using a last block of samples 340 from the useful OFDM symbol 330 and is therefore a cyclic extension to the OFDM symbol (cyclic prefix).

When the channel delay spread exceeds the CP duration 315, the energy contained in the ISI should be much smaller than the useful OFDM symbol energy and therefore, the OFDM symbol duration 325 should be much larger than the channel delay spread. However, the OFDM symbol duration 325 should be smaller than the minimum channel coherence time in order to maintain the OFDM ability to combat fast temporal fading. Otherwise, the channel may not always be constant over the OFDM symbol and this may result in inter-sub-carrier orthogonality loss in fast fading channels. Since the channel coherence time is inversely proportional to the maximum Doppler shift (time-frequency duality), this implies that the symbol duration should be much smaller than the inverse of the maximum Doppler shift.

The large number of OFDM sub-carriers makes the bandwidth of individual sub-carriers small relative to the total signal bandwidth. With an adequate number of sub-carriers, the inter-carrier spacing is much narrower than the channel coherence bandwidth. Since the channel coherence bandwidth is inversely proportional to the channel delay spread, the sub-carrier separation is generally designed to be much smaller that the inverse of the channel coherence time. Then, the fading on each sub-carrier appears flat in frequency and this enables 1-tap frequency equalization, use of high order modulation, and effective utilization of multiple transmitter and receiver antenna techniques such as Multiple Input/Multiple Output (MIMO). Therefore, OFDM effectively converts a frequency-selective channel into a parallel collection of frequency flat sub-channels and enables a very simple receiver. Moreover, in order to combat Doppler effects, the inter-carrier spacing should be much larger than the maximum Doppler shift.

FIG. 4 shows the concepts of frequency diversity 400 and multi-user diversity 405. Using link adaptation techniques based on the estimated dynamic channel properties, the OFDM transmitter can adapt the transmitted signal to each User Equipment (UE) to match channel conditions and approach the ideal capacity of frequency-selective channel. Thanks to such properties as flattened channel per sub-carrier, high-order modulation, orthogonal sub-carriers, and MIMO, it is possible to improve spectrum utilization and increase achievable peak data rate in OFDM system. Also, OFDM can provide scalability for various channel bandwidths (i.e. 1.25, 2.5, 5, 10, 20 MHz) without significantly increasing complexity.

OFDM may be combined with Frequency Division Multiple Access (FDMA) in an Orthogonal Frequency Division Multiple Access (OFDMA) system to allow multiplexing of multiple UEs over the available bandwidth. Because OFDMA assigns UEs to isolated frequency sub-carriers, intra-cell interference may be avoided and high data rate may be achieved. The base station (or Node B) scheduler assigns physical channels based on Channel Quality Indication (CQI) feedback information from the UEs, thus effectively controlling the multiple-access mechanism in the cell. For example, in FIG. 4, transmission to each of the three UEs 401, 402, 403 is scheduled at frequency sub-bands where the channel frequency response allows for higher SINR relative to other sub-bands. This is represented by the Received signal levels R401, R402, and R403 for users 401, 402 and 403 at Frequencies F401, F402, and F403 respectively.

OFDM can use frequency-dependent scheduling with optimal per sub-band Modulation & Coding Scheme (MCS) selection. For each UE and each Transmission Time Interval (TTI), the Node B scheduler selects for transmission with the appropriate MCS a group of the active UEs in the cell, according to some criteria that typically incorporate the achievable SINR per sub-band based on the CQI feedback. A UE may be assigned the same sub-band for transmission or reception of its data signal during the entire TTI. In addition, sub-carriers or group of sub-carriers may be reserved to transmit pilot, control signaling or other channels. Multiplexing may also be performed in the time dimension, as long as it occurs at the OFDM symbol rate or at a multiple of the symbol rate (i.e. from one TTI to the next). The MCS used for each sub-carrier or group of sub-carriers can also be changed at the corresponding rate, keeping the computational simplicity of the FFT-based implementation. This allows 2-dimensional time-frequency multiplexing, as shown in FIG. 5 and FIG. 6.

Turning now to FIG. 5, which is a diagram illustrative of a configuration for multi-user diversity. The minimum frequency sub-band used for frequency-dependent scheduling of a UE typically comprises several sub-carriers and may be referred to as a Resource Block (RB) 520. Reference number 520 is only pointing to one of the 8 RBs per OFDM symbol shown as example and for drawing clarity. RB 520 is shown with RB bandwidth 525 (typically comprising of a predetermined number of sub-carriers) in frequency dimension and time duration 510 (typically comprising of a predetermined number of OFDM symbols such as one TTI) in time dimension. Each RB may be comprised of continuous sub-carriers and thus be localized in nature to afford frequency-dependent scheduling (localized scheduling). A high data rate UE may use several RBs within same TTI 530. UE #1 is shown as an example of a high rate UE. Low data rate UEs requiring few time-frequency resources may be multiplexed within the same RB 540 or, alternatively, the RB size may be selected to be small enough to accommodate the lowest expected data rate.

Alternatively referring to FIG. 6, which is a diagram illustrative of a configuration for frequency diversity, an RB 620 may correspond to a number of sub-carriers substantially occupying the entire bandwidth thereby offering frequency diversity (distributed scheduling). This may be useful in situations where CQI feedback per RB is not available or it is unreliable (as is the case for high speed UEs) and only CQI over the entire frequency band is meaningful. Therefore, a sub-band (or RB) consists of a set of sub-carriers that may be either consecutive or dispersed over the entire spectrum. It should be noted, that another option to achieve frequency diversity is to assign to a UE two or more RBs with each RB comprising of contiguous sub-carriers but and with each RB occupying non-contiguous parts of the bandwidth. In such cases, an RB always consists of a contiguous set of sub-carriers (for both localized and distributed scheduling).

By assigning transmission to various simultaneously scheduled LEs in different RBs, the Node B scheduler can provide intra-cell orthogonality among the various transmitted signals. Moreover, for each individual signal, the presence of the cyclic prefix provides protection from multipath propagation and maintains in this manner the signal orthogonality.

Each scheduled UE is informed of its scheduling assignment by the serving Node B through the downlink (DL) control channel. This control channel typically carries the scheduled UE identities (IDs), RB assignment information, the MCS used to transmit the data, the transport block size, and hybrid ARQ (HARQ) information relating to possible data packet re-transmissions in case of a previous erroneous reception for the same data packet. The control channel may also optionally carry additional information such as for the support of a multi-input multi-output (MIMO) scheme for transmission and reception with multiple antennas. A scheduling assignment may relate either to data transmission from the Node B to a UE (DL of a communication system) or to data transmission from a UE to the Node B (UL of a communication system).

According to one prior art method for the control channel transmission, such as the one employed by the WiMax communication system, the control channel information for all scheduled UEs is jointly coded with a known MCS. This MCS has to be a low one in terms of spectral efficiency (for example, QPSK modulation and low rate convolutional or turbo coding with possible repetitions) as the control channel needs to be received by all UEs in the serving Node B area including ones potentially experiencing very low SINR. As a result, the control channel size and corresponding overhead may become excessively large, thereby adversely affecting the system throughput.

According to another prior art method for the control channel transmission, the control channel information for all scheduled UEs is separately coded with a known fixed MCS and power control may be applied to the transmission. In this manner, the control channel transmission power for UEs located closer to the serving Node B is reduced while the transmission power for UEs located near the edge is increased to account for the path loss. This scheme improves the overall spectral efficiency by reducing the interference caused by the control channel transmission. Nevertheless, as power control adaptation is based on prior CQI feedback from UEs, it is not generally possible to predict the future interference conditions in order for the power control to be effective. Moreover, this transmission method may result to significant and unpredictable interference variations making the whole scheduling process less reliable. For example, a conflict occurs when the control channels to cell edge UEs in adjacent Node Bs are transmitted from these Node Bs using substantially the same frequency resources. Then, transmission power control is ineffective as it is substantially cancelled since the interfering transmissions apply the same transmission power control. Separate transmission of the control channel to scheduled UEs with a fixed MCS is used in the 3GPP HSDPA communication system.

Thus, there is a need for a method to provide reliable transmission of the DL control channel while optimizing the corresponding spectral efficiency of the transmission in a communication system.

SUMMARY

Embodiments of the invention provide methods for robust control channel transmission with optimum spectral efficiency in the downlink of a communication system. Based on explicit or implicit channel quality indicator (CQI) feedback from user equipments (UEs) and the estimated path loss, a serving base station (Node B) transmits the control channel to a scheduled UE using a modulation and coding scheme (MCS) substantially determined from the CQI feedback for said UEs. This CQI feedback may be explicit for the communication in the downlink (DL) channel or implicit through the transmission of a reference signal for the communication in the uplink (UL) channel. The spectral efficiency of the corresponding control channel transmission is optimized by having the Node B select the appropriate MCS.

As the number of DL and UL scheduled UEs may vary during consecutive transmission time intervals (TTIs) and the corresponding control channels may be transmitted with different MCS, the size of the total control channel may also vary. The Node B communicates the number of DL and UL scheduling assignments in each MCS region, belonging to a predetermined set of MCS regions, through a field that is separately transmitted prior to the remaining part of the control channel carrying the DL and UL scheduling assignments. Alternatively, the Node B may communicate the size of the control channel in each of the MCS regions. This field has a fixed and pre-determined size and MCS and should be received at least by all DL and UL UEs having scheduling assignments and potentially by all UEs communicating with the reference serving Node B regardless if they receive a scheduling assignment during the reference TTI. Then, each UE can know of the size of the control channel and, for a pre-determined form of transmission of the control channel codewords in the various MCS regions (for example, codewords in the lowest MCS region are transmitted first in pre-determined time-frequency resources, followed by the codewords in the second lowest MCS region, and so on) the UE can know of the MCS region where its control channel codeword is transmitted. MCS regions are assumed to be ranked according to their spectral efficiency (for example, the MCS region with QPSK modulation and ⅓ code rate is ranked lower than the MCS region with QAM16 modulation and ¼ code rate). Since all scheduled UEs can know the control channel size, no time-frequency resources need to be wasted for transmission of DL data packets since all of the remaining resources can be utilized for data transmission without additional signaling, thereby effectively additionally improving the spectral efficiency of the control channel transmission.

These and other features and advantages will be more clearly understood from the following detailed description taken in conjunction with the accompanying drawings and claims.

BRIEF DESCRIPTION OF THE DRAWINGS

For a more complete understanding of the disclosure and the advantages thereof, reference is now made to the following brief description, taken in connection with the accompanying drawings and detailed description, wherein like reference numerals represent like parts.

DETAILED DESCRIPTION

Figure 1:
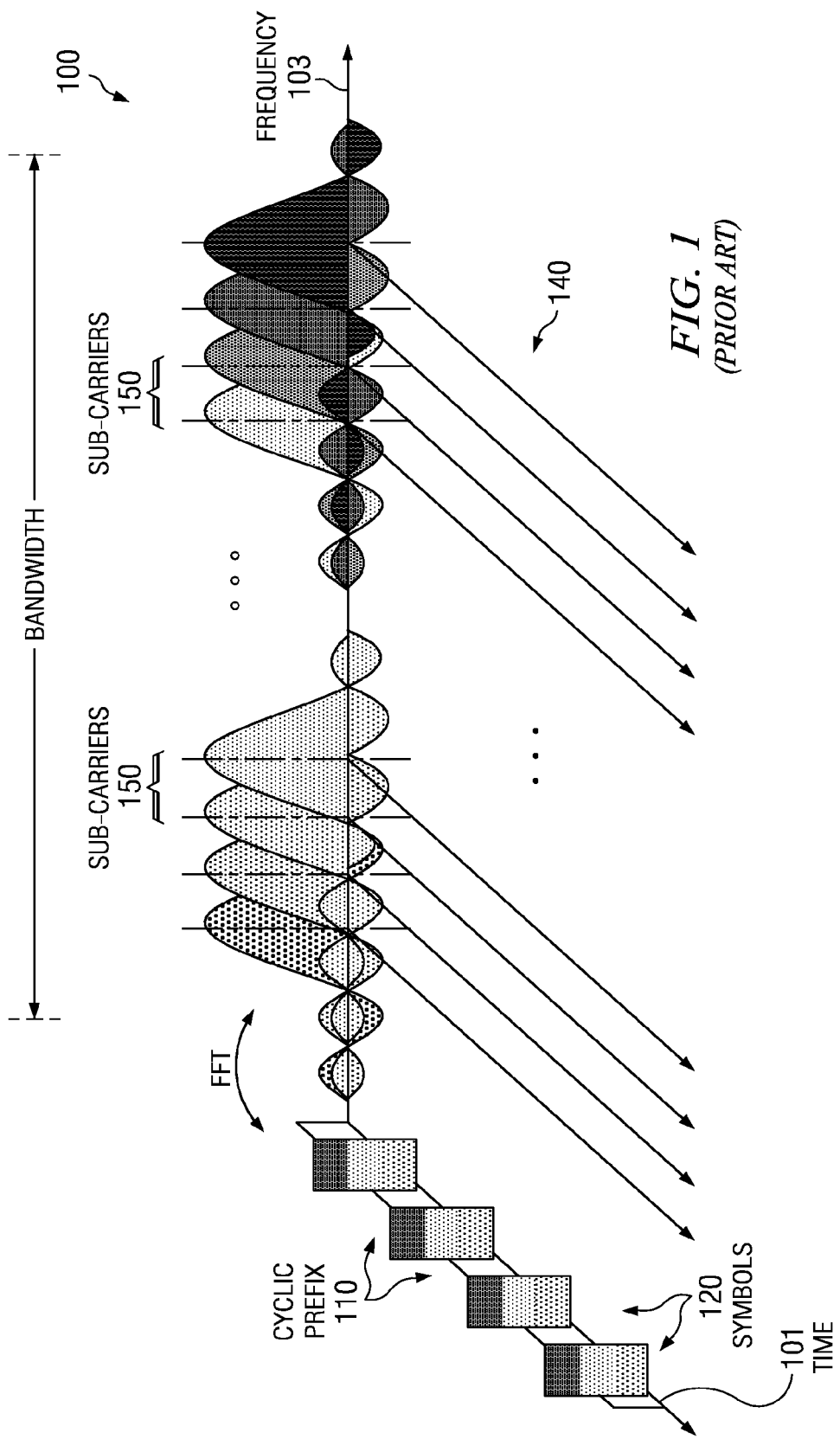
FIG. 1 is a diagram illustrative of the Frequency-Time Representation of an OFDM Signal.
Figure 2:
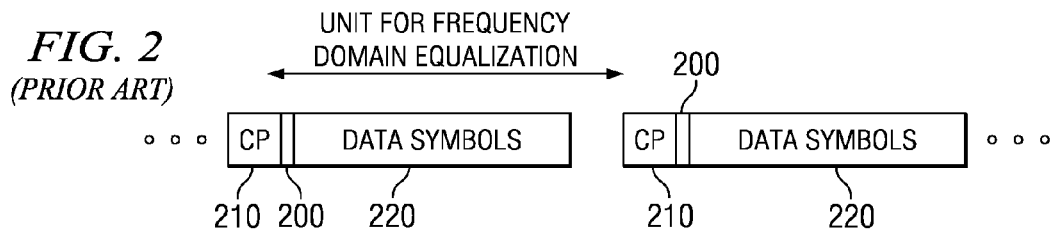
FIG. 2 is a diagram illustrative of using cyclic prefix (CP) to eliminate ISI and perform frequency domain equalization.
Figure 3:
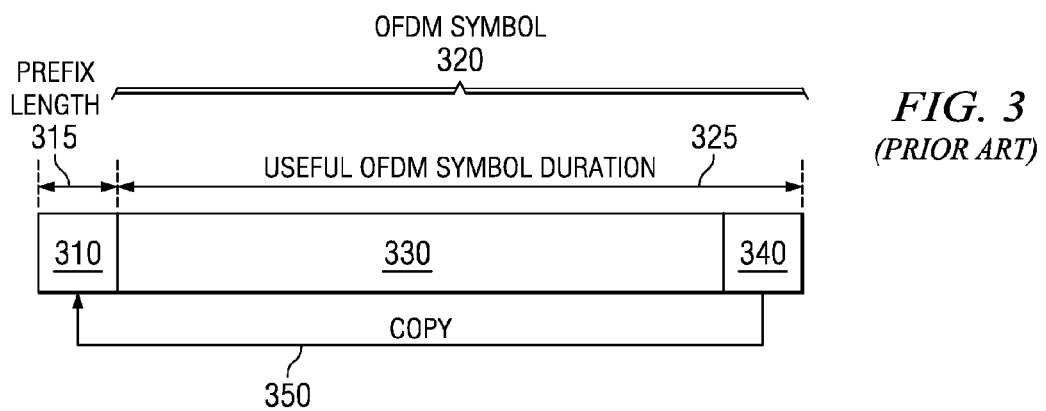
FIG. 3 is a diagram illustrative of Cyclic Prefix (CP) Insertion
Figure 4:
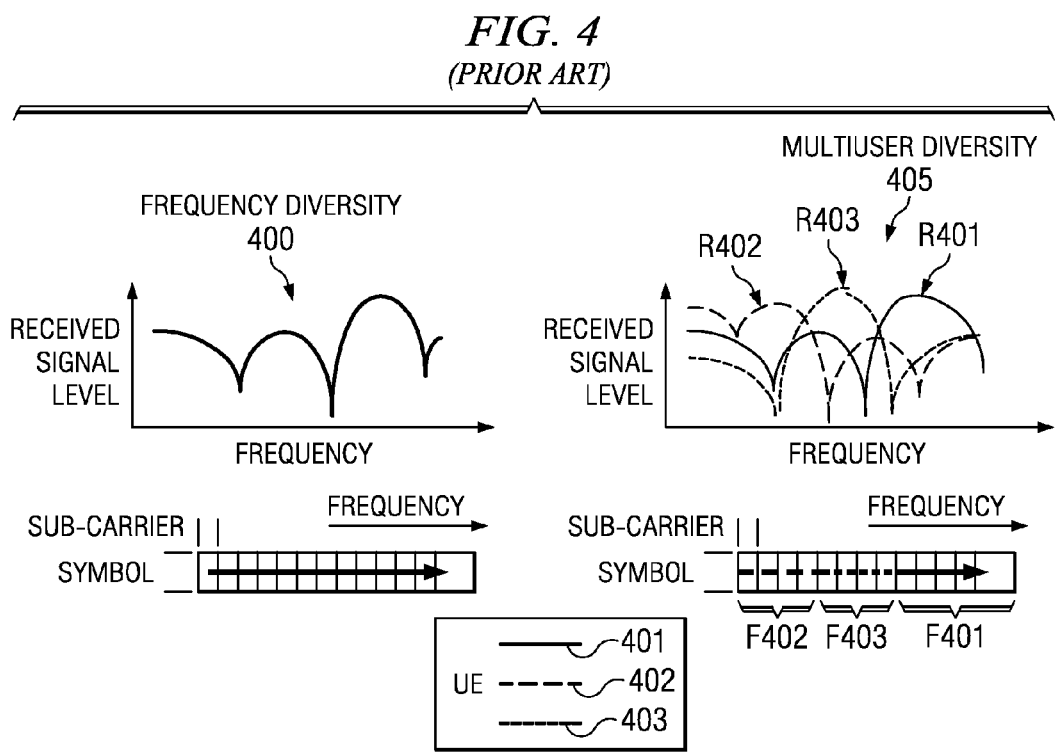
FIG. 4 shows the concepts of frequency and multi-user diversity.
Figure 5:
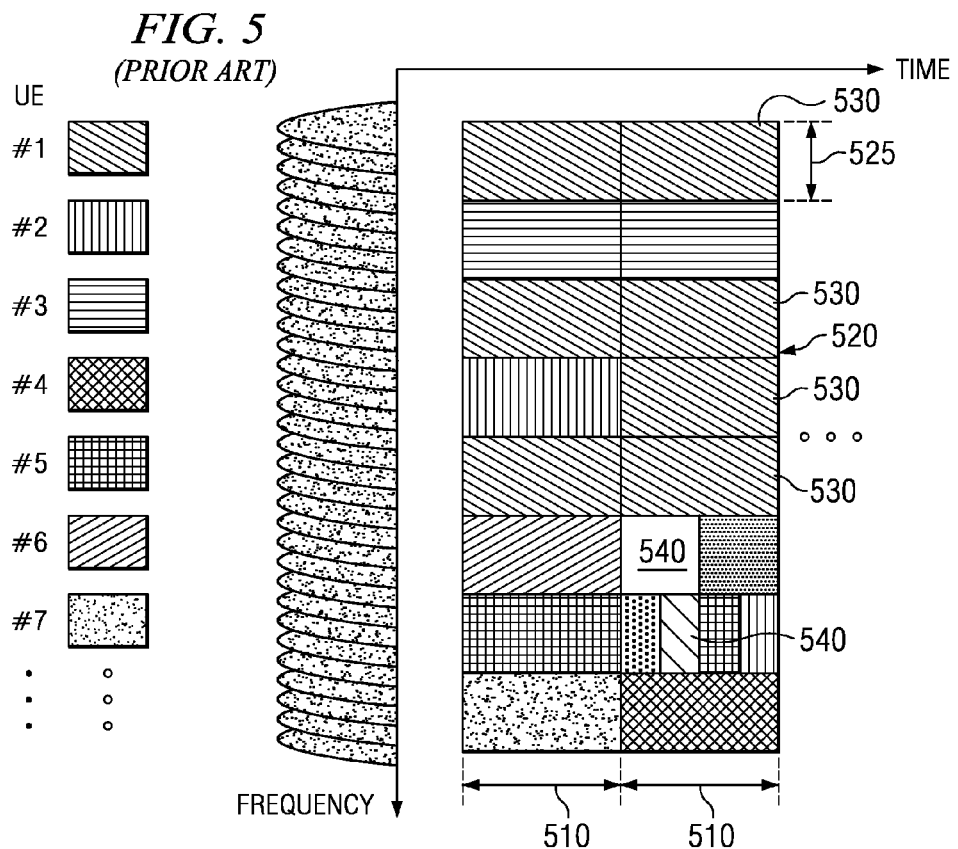
FIG. 5 is a diagram illustrative of a configuration for Multi-User Diversity.
Figure 6:
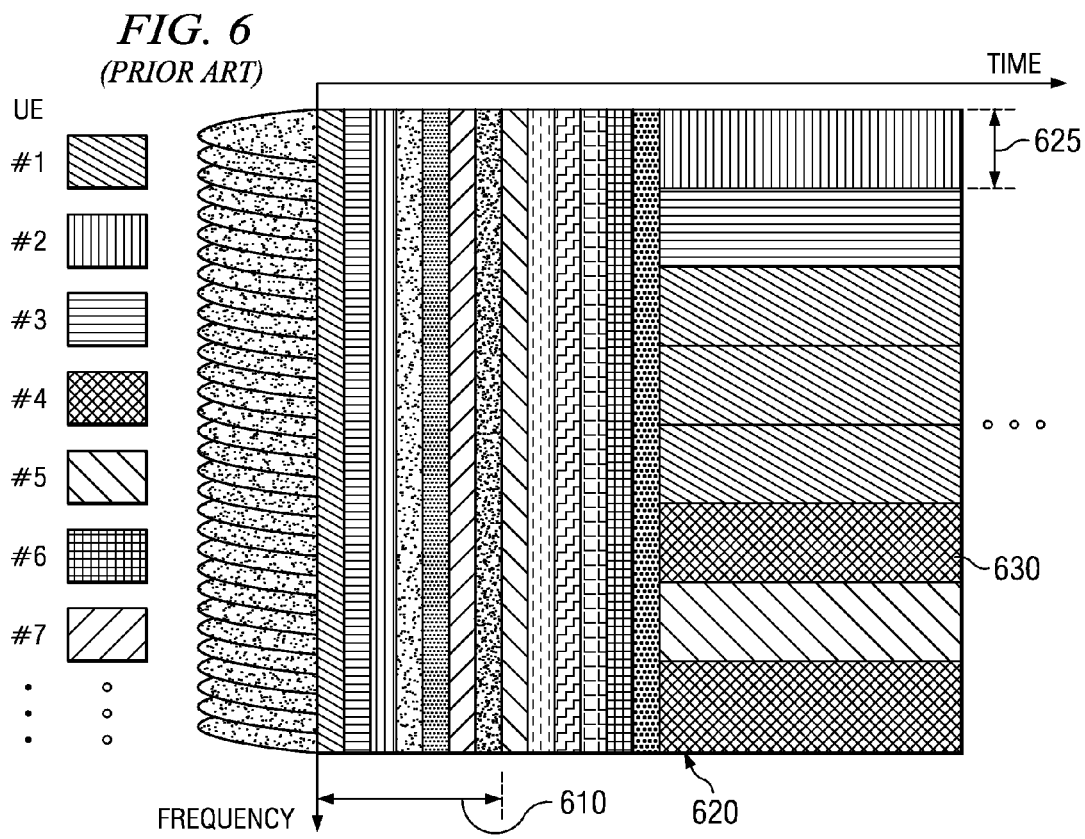
FIG. 6 is a diagram illustrative of a configuration for frequency diversity.

It should be understood at the outset that although an exemplary implementation of one embodiment of the disclosure is illustrated below, the system may be implemented using any number of techniques, whether currently known or in existence. The disclosure should in no way be limited to the exemplary implementations, drawings, and techniques illustrated below, including the exemplary design and implementation illustrated and described herein, but may be modified within the scope of the appended claims along with their full scope of equivalents.

Embodiments of the invention address the problem of spectrally efficient control signalling design for scheduling of downlink (DL) and uplink (UL) data packet transmissions in OFDMA-based networks, including variants of the OFDMA transmission method such as the single-carrier FDMA (SC-FDMA) transmission method. The DL of a communication system refers to the communication from a serving base station (also commonly referred to as Node B) to one or more UEs and the UL refers to the communication from one or more UEs to a serving Node B. The control channel is transmitted in the DL (from the Node B to the scheduled UEs).

The DL control channel, also referred to as DL shared control channel (SCCH), is a major part of the DL overhead (in addition to reference signals and other synchronization or broadcast channels) that directly impacts the achievable throughput and peak data rates. Minimization of this overhead requires corresponding minimization of the corresponding signaling bits and optimization for the spectral efficiency of the SCCH transmission. While only minor improvements are possible for the former, mainly through efficient mapping techniques for the scheduled ULE identities (IDs) and frequency resource block (RB) allocations, the latter requires careful transmission design.

In the following discussion, a field indicating the SCCH size is referred to as SCCH Category 0 (or Cat0). This field does not carry any information relating to DL or UL scheduling assignments. Rather, its purpose is to dimension the control channel so that UEs know how to decode the remaining SCCH that carries the scheduling related information. The SCCH part carrying the scheduled UE IDs and allocated RB position for each scheduled UE is referred to SCCH Category 1 (or Cat1). The remaining SCCH part is referred to as Category 2 (or Cat2). Cat2 carries information related to the modulation and coding scheme (MCS) applied to the data transmission, the transport format, hybrid ARQ (HARQ) information relating to possible data packet retransmissions and possibly additional information such as for the multi-input multi-output (MIMO) antenna scheme applied to data transmission.

This invention describes an SCCH structure involving Cat0 and the remaining SCCH (carrying scheduling assignment information). For the DL scheduling assignments (or scheduling grants), Cat2 may be transmitted either separately to Cat1 in RBs assigned to DL data transmission or together with Cat1 (in a single codeword as known in prior art). Clearly, only joint transmission of Cat1 and Cat2 is possible for UL scheduling assignments as there are no corresponding RBs in which data transmission follows in the DL (unless a UE has simultaneous DL and UL scheduling assignments). For ease of reference, the remaining SCCH (other than Cat0), will be referred to as Cat1, particularly in some Figures. It is not relevant to the invention whether Cat2 for DL assignments, as described in the previous paragraph, is transmitted together or separately to Cat1.

Figure 8:
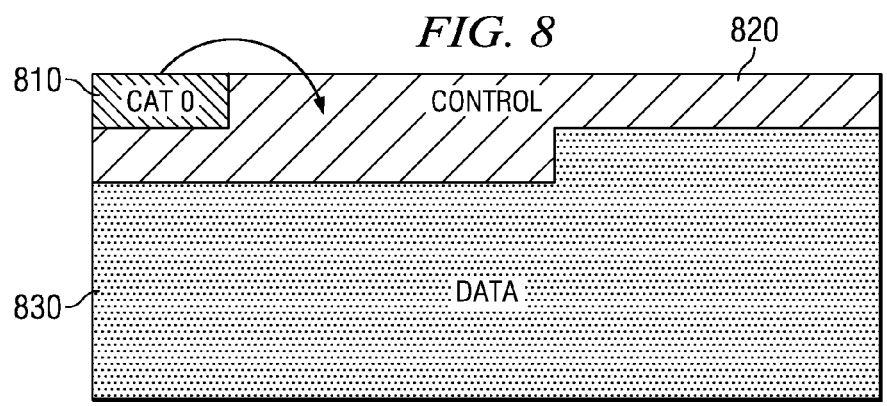
FIG. 8 shows an exemplary partitioning of the downlink transmission time interval (TTI) illustrating the transmission of the control channel Category 0, the remaining control channel, and the data channel.

FIG. 8 shows an exemplary partition for Cat0 810 and the remaining SCCH 820. As it was previously mentioned, Cat0 has a predetermined size and transmitted with an MCS that is known to all UEs. It specifies the size of the remaining SCCH. It is not necessary that Cat0 is transmitted in contiguous sub-carriers before the remaining SCCH and in practice the sub-carriers carrying the two may be multiplexed to provide frequency diversity. The remaining time-frequency resources can be assumed to be allocated to data 830, or other channels such as the reference signal channel, the synchronization channel, and the broadcast channel.

Figure 9:
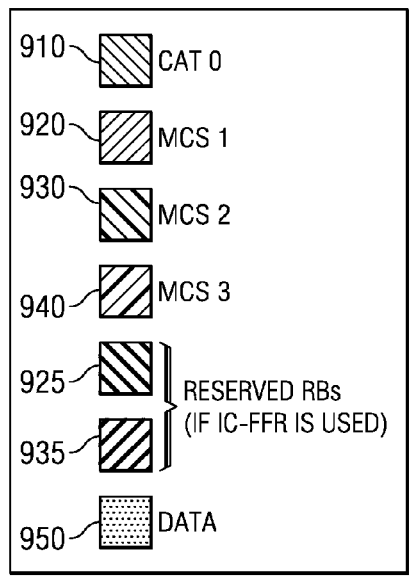
FIG. 9 shows an exemplary transmission of the control channel Category 0, and of the remaining control channel in various modulation and coding scheme (MCS) regions. Time division multiplexing (TDM) is assumed between the control and data channels.
Figure 9:
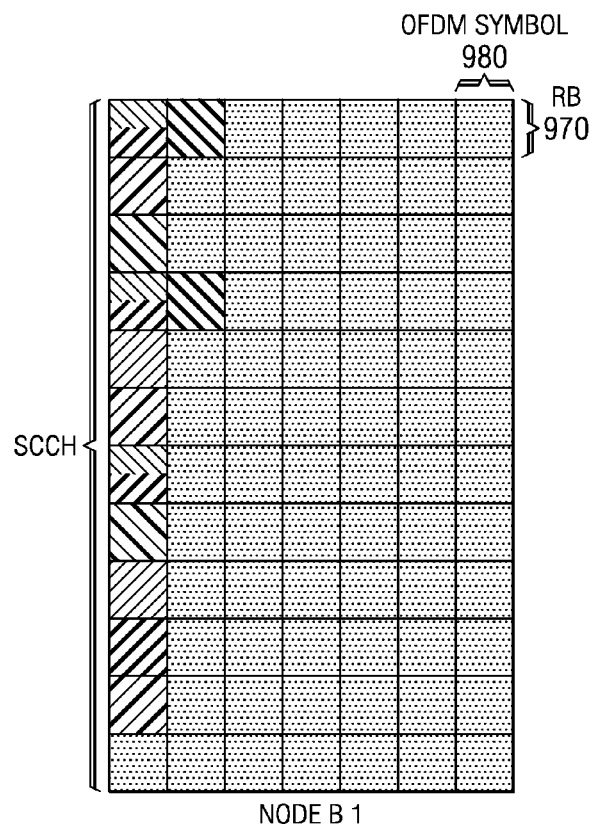
Figure 9:
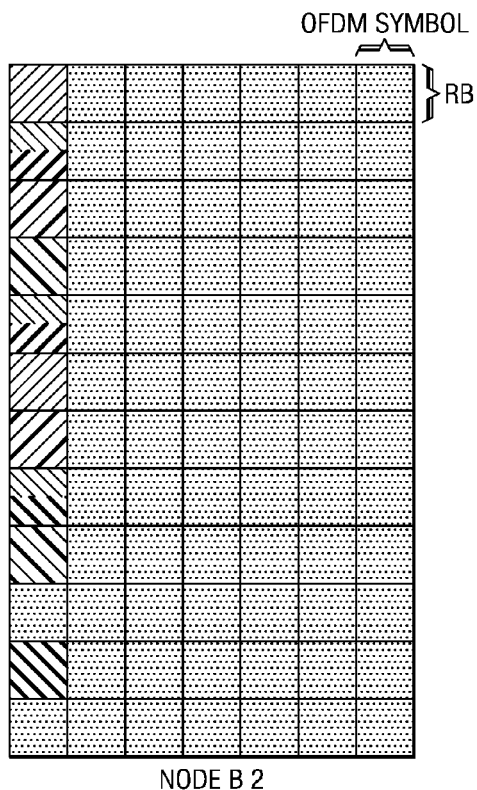
Figure 9:
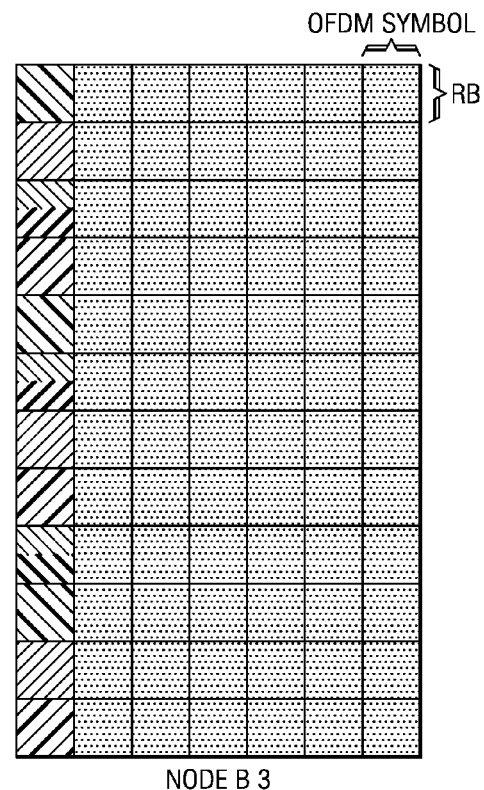
Figure 10:
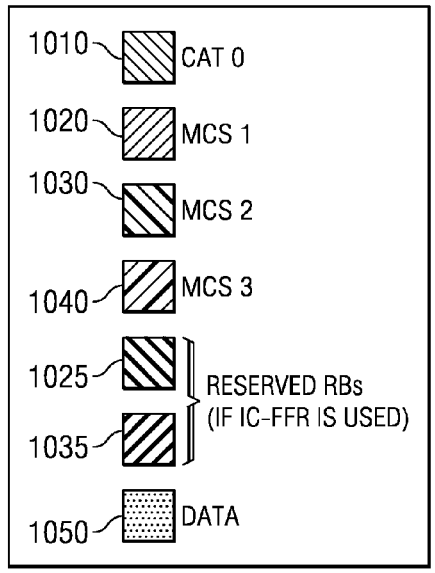
FIG. 10 shows an exemplary transmission of the control channel Category 0, and of the remaining control channel in various modulation and coding scheme (MCS) regions. Frequency division multiplexing (FDM) is assumed between the control and data channels.
Figure 10:
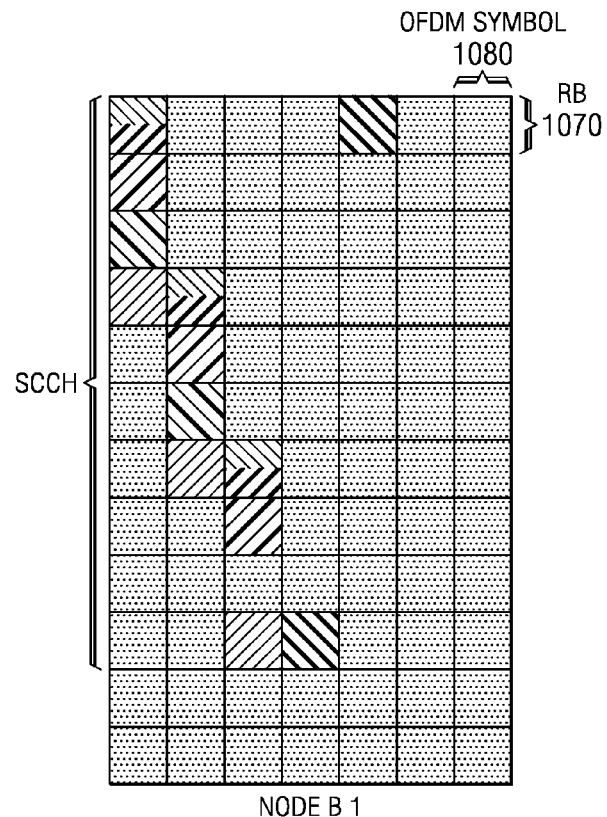
Figure 10:
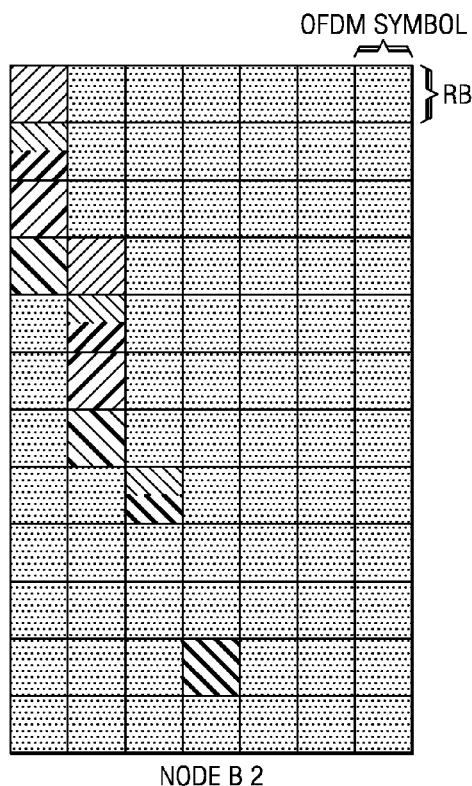
Figure 10:
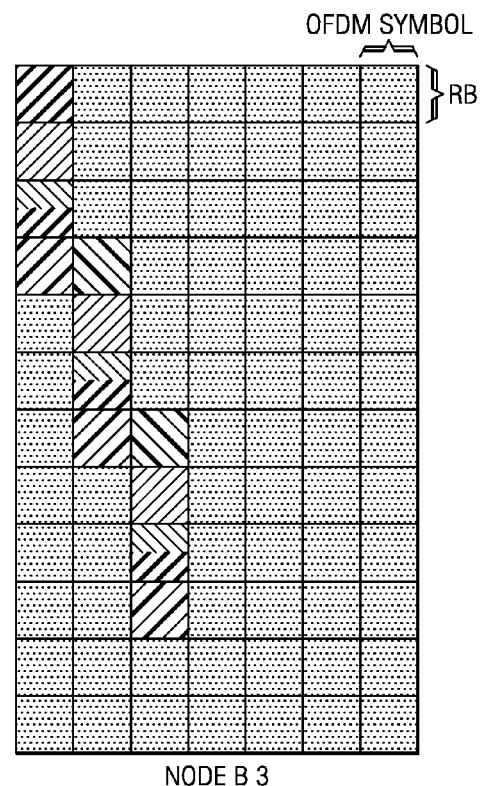

FIG. 9 and FIG. 10 show an exemplary structure for SCCH Cat0 and Cat1 (remaining SCCH) further illustrating the embodiments of the invention. Time Division Multiplexing (TDM) of the control and data channels is assumed in FIG. 9. Frequency Division Multiplexing (FDM) is assumed in FIG. 10. In the following, we refer to the TDM option but the same descriptions and arguments also apply for the FDM one.

Cat0 910 informs the UEs of the remaining SCCH size, thereby limiting the waste of resources associated with having a fixed SCCH size which may not always be filled. The exemplary SCCH granularity in FIG. 9 is one RB 970 in one OFDM symbol 980 but it can generally be any number of sub-carriers, including one sub-carrier, or even one OFDM symbol. Obviously, the smallest granularity in an MCS region is specified by the minimum number of resources (typically RBs) required for the transmission of a single DL or UL scheduling assignment, whichever is smaller. Larger granularities than the minimum one may also be used and may extent to half or even one OFDM symbol. In such cases, the SCCH size specified by Cat0 in an MCS region implies that the each of the numbers for the corresponding DL and UL scheduling assignments is above the ones for the next lower possible SSCH size, if any, and equal to or smaller than the ones for the specified SSCH size.

The control channel (scheduling assignment) corresponding to a scheduled UE is transmitted with a MCS determined by the SINR that will be experienced by the transmission to that UE. The serving Node B can determine this SINR either based on the DL CQI reported by each UE having a DL scheduling assignment, or implicitly based on the UL CQI the serving Node B determines for each UE having an UL scheduling assignment. The larger the SINR, the higher the MCS in terms of spectral efficiency. As the exemplary embodiment considers that the control channel transmission from the serving Node B to each scheduled UE is distributed in frequency, the MCS region may be determined based on the average SINR and not the individual SINR in each RB. Three MCS regions 920, 930, and 940 are considered (as an example) in FIG. 9 (the same applies in FIG. 10) and the remaining RBs in the OFDM symbols of a TTI are allocated to data 950 and other channels such as reference signals (not shown). Reference signals may also occupy OFDM symbols where the control channel is transmitted. In general, more than three MCS regions may be used as shown below for example in Table 1. Repetition coding of one MCS results into a different MCS (with spectral efficiency that is inversely proportional to the repetition factor).

TABLE 1

| | |
|---|---|
| MCS 7 | 16QAM, R = $2/3$ |
| MCS 6 | 16QAM, R = $1/2$ |

TABLE 1-continued

| MCS 5 | 16QAM, R = 1/3 |
| MCS 4 | QPSK, R = 1/2 |
| MCS 3 | QPSK, R = 1/3 |
| MCS 2 | QPSK, R = 1/4 |
| MCS 1 | QPSK, R = 1/3, 2x repetition |
| MCS 0 | QPSK, R = 1/4, 2x repetition |

Figure 7:
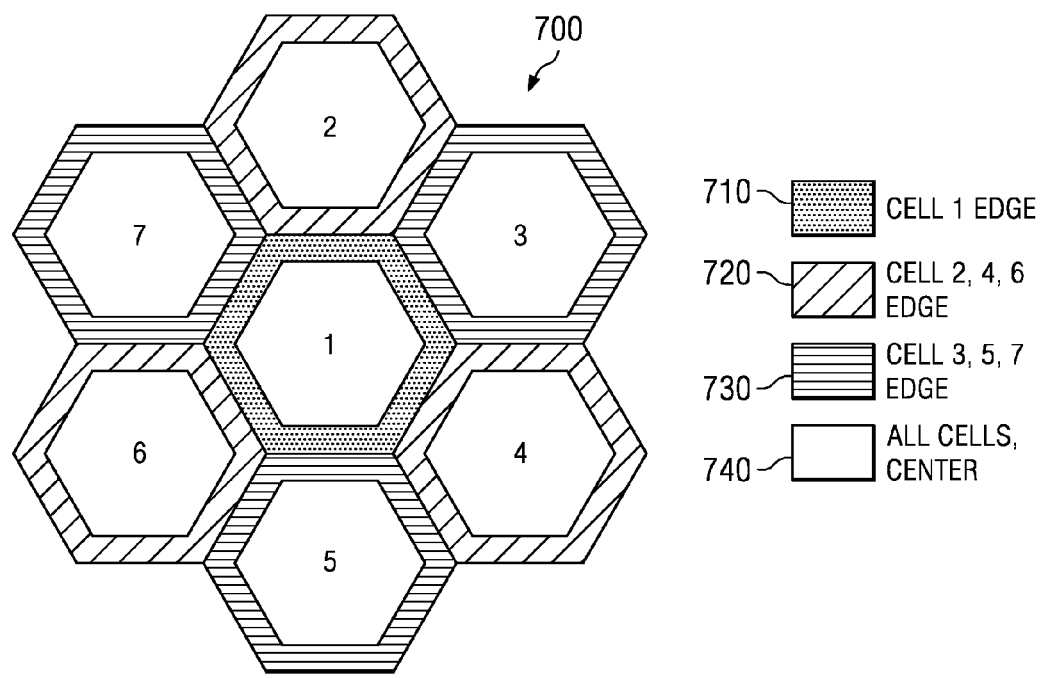
FIG. 7 shows an exemplary cell structure highlighting the cell edges where reserved resource blocks are used for transmission by each Node B through application of interference co-ordination through fractional frequency re-use.

The lowest MCS region 925 in terms of spectral efficiency (or additionally the next lower MCS region(s) 935 if possible in terms of available resources) may be associated with reserved RBs for use at the cell edge through the application of cell edge interference co-ordination through fractional frequency reuse (IC-FFR), embodiments of which are described in co-pending U.S. application Ser. No. 11/535,867. With IC-FFR, certain RBs in a reference Node B are reserved to be protected by interference from interfering (adjacent) Node Bs by imposing the restriction that the interfering Node Bs do not transmit with full power in the RBs reserved by the referenced Node B (FIG. 7). In the example of FIG. 7, cell 1 is allocated one-third of that spectrum 710, cells 2, 4, and 6 are allocated a second one-third 720, and cells 3, 5, and 7 are allocated the final one-third 730. When the Node B scheduler of any of the previous cells schedules a set of UEs for transmission, it may assign the one-third of these scheduled UEs it determines to be located closer to the cell edge (than the remaining two-thirds of UEs) in the one-third of reserved RBs this reference Node B has been allocated. The remaining two-thirds of scheduled UEs, deemed to be located closer to the cell interior, are scheduled in the remaining two-thirds of the available spectrum. With IC-FFR, the low SINR values of the geometry CDF are improved and no repetition coding is necessary, thereby improving spectral efficiency and avoiding unnecessary increase of the SCCH size and the corresponding overhead.

The control channel codeword carrying the scheduling assignment information for each DL or UL scheduled UE is transmitted with an MCS corresponding to the SINR conditions of the referenced UE as determined by the serving Node B. As the SINR conditions experienced by UEs in the serving area of a Node B may have significant variations, multiple MCS regions are used to capture the SINR conditions. The larger the number of MCS regions, the smaller the granularity of the SINR range captured by each MCS region but the larger the Cat0 size and overhead. The MCS regions are predetermined.

The main embodiment of this invention, that is further described in the remaining of this application, can be summarized as follows: A field referred to as Cat0 is transmitted by the serving Node B and should be designed so that it is received by all UEs with a desired reliability. Cat0 implicitly or explicitly informs of the size of the remaining control channel in each MCS region. Cat0 is transmitted by the serving Node B with a predetermined MCS and a predetermined size and both are known in advance by all UEs. The MCS regions are predetermined.

a. With use of IC-FFR, Cat0 may be transmitted in reserved RBs to mitigate inter-cell interference and may occupy part or all of the reserved RBs.

b. With the use IC-FTR, Cat0 may correspond to different pre-determined MCS regions during different TTIs.

Additional attributes of the SCCH transmission (including Cat0) are outlined as follows:

a) Puncturing and repetition may be used to fit Cat0 or the remaining SCCH into an integer number of RBs (or, in general for the remaining SCCH, into a multiple of the minimum number of resources required for the transmission of a control channel codeword for DL or UL scheduling assignments in each MCS region).

b) The number of RBs for each MCS region directly depends on the number of DL and UL scheduled UEs having their SCCH (other than Cat0) transmitted in that MCS region.

c) With application of IC-FFR, at least one or more RBs are reserved in each cell for protection from inter-cell interference. The position of the first reserved RB can be a function of the cell ID or it can be signaled in the synchronization channel (SCH) or in the broadcast channel (BCH). Two signaled bits are required for an effective soft frequency re-use factor of 3 with IC-FFR. SCCH transmission (including Cat0) to cell edge UEs is carried through the reserved RBs that are protected from most of the inter-cell interference.

d) With IC-FFR, the relative position of the MCS regions can be specified relative to the one of the reserved RBs. Alternatively, without IC-FFR, the relative position of the MCS regions may depend on the order of these regions. For example, the first RB in FIG. 8 may be occupied by the lowest (UE populated) MCS region, the second RB may be occupied by the next lower MCS region and so on. The MCS regions may be ranked in accordance to their spectral efficiency. For example, an MCS employing QPSK modulation and code rate of 1/3 has a lower rank than an MCS region employing QAM16 modulation and code rate 1/3.

e) Frequency hopping (FH) is applied to RBs (or sub-carriers) carrying the same control channel codeword to provide frequency diversity. This also allows effective link adaptation for distributed scheduled UEs.

f) If one MCS region ends while another continues, the RBs (or sub-carriers) of the latter can continue following the same pattern, leaving RBs (or sub-carriers) that would be occupied by the former for the data channel. Alternatively, they can change the pattern and occupy RBs (or sub-carriers) of the former so that Cat1 has a continuous structure (for a small loss in frequency diversity). This can be predetermined and each UE knows of the RBs (or sub-carriers) occupied by Cat1 (remaining SCCH) through Cat0.

g) Based at least on the reported CQI, the scheduler first determines the number of UEs whose SCCH transmission (not including Cat0) can achieve the desired codeword error rate target (e.g. 1%) with the highest MCS. Subsequently, the second highest MCS is considered, and so on until the SCCH of all UEs selected for scheduling is mapped onto a certain MCS.

h) If for any scheduled UEs, the SCCH transmission cannot achieve the desired target codeword error rate (at the lowest predetermined MCS region), the transmission may either still occur if it can achieve reasonably low error rate or scheduling of these UEs can be postponed for a later transmission time interval (TTI)—blocked transmission. The selection of the lowest MCS region should be such that blocked transmissions are very infrequent (e.g. 1% or less probability of a blocked transmission) and depends on the SINR distribution of UEs in the serving Node B.

i) The size of each MCS region may vary between consecutive TTIs depending on the number of UEs whose Cat1 (remaining SCCH) is transmitted in each MCS region.

j) Cat0 and the remaining SCCH are transmitted with priority to data at or near the beginning of a transmission time interval.

The SINR that will be experienced by each transmission from the serving Node B to each DL or UL scheduled UE can be utilized to code the control channel information (scheduling assignments) in the appropriate MCS region in order to ensure reception with a target error rate. In addition to the SINR, the MCS region depends on the transmitter and receiver antenna diversity, on the UE speed (as determined for example based on Doppler shift estimation at the serving Node B), and on the multi-path propagation conditions introduced by the channel medium to each transmitted control channel signal as they directly impact the achievable control codeword error rate for a given SINR value. For DL scheduled UEs, the SINR is determined from the CQI feedback these UEs provide to the serving Node B in order for the latter to schedule the transmission of data packets (by determining the MCS and the RBs used for the data transmission to a corresponding scheduled UE). For UL scheduled UEs, the SINR may be determined at the serving Node B through the transmission of a reference signal by each UL scheduled UE over the entire UL scheduling bandwidth for that UE.

Although the DL communication channel used for the control signaling (scheduling assignments) transmission and the UL communication channel used to obtain an SINR estimate for UL scheduled UEs may have different fading characteristics, the additional diversity provided by the possible multiple transmitter and receiver antennas and the frequency hopped transmission of the control channel introducing frequency diversity can effectively mitigate the impact of variations in the fading characteristics between the two communication channels. Moreover, as the multi-path propagation characteristics experienced by a given UE are typically the same in the DL and UL of a communication system, the Node B may use this information to provide additional protection to UEs experiencing low multi-path diversity by placing the corresponding control signaling information in a lower MCS region than indicated by the UL SINR measurement, thereby providing some performance margin.

The main embodiment of the invention relates to the transmission of a field implicitly or explicitly specifying the size of the remaining control channel (communicating the scheduling assignments) in each of the pre-determined MCS regions and therefore, (exactly or approximately, respectively) specifying the number of DL and UL UEs whose codewords are transmitted in each of the pre-determined MCS regions. This field is referred to as Cat0. Cat0 is a critical field that should be accurately received by all UEs in the cell as it is necessary to correctly decode the remaining SCCH carrying the scheduling assignments. Therefore, its MCS should be low enough to ensure accurate reception by UEs in very low SINR regions that are expected in the serving Node B.

As the Cat0 transmission spectral efficiency is small, additional mechanisms may be used to ensure that Cat0 does not consume a lot of resources. One way to improve the spectral efficiency of Cat0 transmission is to place it in reserved RBs for which UEs at the cell edge are substantially protected from inter-cell interference through IC-FFR. This will increase the lower expected SINR values, thereby improving the spectral efficiency as a higher MCS can be used (relative to the case of no IC-FFR). For example, with IC-FFR Cat0 may be transmitted with QPSK modulation and rate 1/3 convolutional coding assuming transmitter and receiver antenna diversity while without IC-FFR Cat0 codeword repetitions may be needed for the same transmission parameters.

The information bits in Cat0 depend on the number of MCS regions used for the remaining SCCH transmission and on the maximum number of scheduled UEs in the DL and UL of the communication system. For example, for 10 MHz operating bandwidth and 6 MCS regions, having 3 bits to indicate the number of LEs per MCS region (for a maximum of 7 DL/UL codewords per MCS region), the total number of information bits needed for Cat0 is 36. For 3 MCS regions, the corresponding number of Cat0 information bits is 18. It should be noted that the number of DL scheduled UEs needs to be indicated separately from the number of UL scheduled UEs as the corresponding numbers of control signaling bits (SCCH sizes) are typically different.

Several ways to reduce the number of bits per MCS region may be considered. For example, certain MCS regions may statistically support a smaller number of UEs than others and the corresponding number of bits may be reduced (for example, from 3 to 2). Also, some restrictions can be placed on the scheduler regarding the UEs that can be scheduled in each TTI. As the scheduling gains are mostly applicable to low speed UEs for which the channel does not materially change between consecutive TTIs, the scheduler may not use a subset of possible MCS regions in one TTI and use them at the next TTI (where the corresponding UEs are also scheduled). With this method, the pattern of used MCS regions across TTIs needs to be pre-determined.

Since a (typically) 16-bit CRC transmission requires similar overhead (number of bits) as Cat0, CRC transmission may be avoided. The remaining SCCH is protected by CRC and incorrect reception of Cat0 by a scheduled UE will be subsequently recognized by the inability of that UE to correctly decode the remaining SCCH. Nevertheless, there may be situations where it is preferable that all UEs, and not just scheduled ones, decode Cat0. In such case, CRC protection of Cat0 is required.

Another option for the reduction of Cat0 overhead is to transmit it periodically (once every multiple TTIs). This is meaningful only if the associated Cat0 overhead reduction is larger than the overhead associated with "empty" SCCH transmissions in some MCS regions. "Empty" SCCH transmissions occur when the initial Cat0 indication for the SCCH codewords in the various MCS regions is not fulfilled in subsequent TTIs prior to the next Cat0 transmission. For example, if the Cat0 transmission indicates 3 DL UEs and 2 UL UEs codewords in an MCS region, subsequent SCCH transmissions cannot exceed these numbers for either the DL or UL scheduled UEs (implying scheduler restrictions). In case a smaller number of DL or UL UEs have their codewords transmitted in the referenced MCS region (for example, 2 DL UEs and 2 UL UEs), the remaining resources (in the example, the resources for the third DL LE SCCH codeword) as implicitly indicated by the initial Cat0 transmission may remain empty and may not used for data transmission as the LEs cannot directly know the SCCH size. Alternatively, each UE may perform blind detection for the possible size of each MCS region, provided that it has small variations relative to its value as specified by the last transmission instance of Cat0, however, this entails additional UE decoding complexity. Moreover, periodic transmission of Cat0 over several TTIs also restricts the spectral efficiency of the remaining SCCH transmission, for example due to the inability in subsequent TTIs to place Cat1 of scheduled UEs in good SINR conditions in a higher MCS region by increasing its size.

Typically, SCCH transmission to a single UE (DL or UL) in poor SINR condition has to be supported with a low MCS and, as a result, it requires resources that can be comparable to those of Cat0. Therefore, as many UEs need to be simultaneously scheduled and as low MCS regions need to often exist in the SCCH transmission, the inability to reasonably adapt the SCCH between TTIs can be costlier than the transmission of Cat0 in every TTI. Even if the Cat0 transmission period is as often as every other TTI, it likely remains in general a worse alternative to continuous Cat0 transmission in every TTI if even small variations in the number of scheduled UEs in the lower MCS regions occur between consecutive TTIs. The preferred embodiment considers Cat0 transmission in the DL of a communication system in every TTI but the application does not preclude periodic Cat0 transmission (once every a number of TTIs larger than one).

Another option for the reduction of Cat0 overhead is to increase the granularity of the control channel size that is specifies. For example, instead of specifying the exact number of DL and UL UEs having scheduling assignments, a larger (than one) granularity can be used. Although this reduces the number of required Cat0 bits in each MCS region, it also increases the waste of resources in case the number of DL and UL scheduling assignments are within but not equal to the selected granularity.

It should be noted that the Cat0 transmission may be utilized without having multiple MCS regions for the transmission of the DL and UL scheduling assignments. In the case of a single MCS, Cat0 simply reduces to specifying the number of DL and UL control channel codewords during a TTI for the given MCS either with granularity of one (exact number) or with larger granularity.

As the control size codeword size may depend on whether MIMO is employed, UEs for which MIMO transmission is supported can have different control size codeword size than UEs for which MIMO transmission is not supported. To account for this codeword size variability in dimensioning the control channel size, Cat0 may also specify the number of UEs having MIMO transmission in each MCS region for either DL or UL scheduling assignments.

If Cat0 specifies that the control channel terminates at a fraction of an OFDM symbol, the remaining RBs in that symbol (RBs that are not occupied by the control channel) can be used for data assignment. Which UE gets which of the remaining RBs in the OFDM symbol partially occupied by the control channel can be determined according to a pre-specified rule. Typically, RB allocation is valid for a specific time duration, such as one TTI. Then, for any reference RB from the aforementioned remaining RBs in the OFDM symbol partially occupied by the control channel, the UE assigned the same RB for data reception in the DL may also assume that it also gets data allocation in the reference RB in the OFDM symbol partially occupied by the control channel.

Moreover, as unicast transmission (that is, dedicated communication between a serving Node B and a UE) may be TDM with multicast/broadcast transmission (that is, transmission of the same information from multiple Node Bs), DL unicast may not exist during certain TTIs while UL unicast may continue. For this reason, the control channel for unicast may still be transmitted in multicast/broadcast TTIs carrying only UL scheduling information, as suggested in U.S. Application 60/733,675. In such cases, Cat0 carries the aforementioned information only for UL scheduling assignments.

Another information field that may be included in Cat0 is an indication for the reference signal (RS) structure, the RS is also known as pilot signal, for the serving Node B. This is because, especially for multiple Node B transmitter antennas, different RS overheads may be needed to accommodate supportable UE velocities (with higher UE velocities typically requiring higher RS overheads). A 1-bit indicator in Cat0 can then be used to inform the UEs between two possible RS structures (one with lower overhead and one with higher overhead) depending on the type of DL (and possibly UL) scheduled UEs (for example, the RS structure with the higher overhead can be used when there are high velocity UEs sched-uled in the reference TTI; otherwise the RS structure with the lower overhead can be used). This field may obviously contain more than 1 bit if finer granularity of RS overhead with the velocity of scheduled UEs is needed. Although not related to the control channel, such a field will be necessary in Cat0 to enable dynamic selection of the RS structure per TTI according to the needs of the DL (and possibly UL) scheduled UEs.

While several embodiments have been provided in the disclosure, it should be understood that the disclosed systems and methods may be embodied in many other specific forms without departing from the spirit or scope of the disclosure. The examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method, comprising the steps of:
transmitting by an apparatus control signaling information in a transmission time interval comprising multiple symbols; and
transmitting a field with a predetermined modulation and coding scheme in the first of said multiple symbols, said field indicating the size of said control signaling information by indicating the number of symbols used to transmit said control signaling information.

2. The method of claim 1, wherein said field is transmitted during each transmission time interval.

3. The method of claim 1, wherein said field is transmitted once in multiple transmission time intervals.

4. The method of claim 1, wherein said field is located in at least a portion of more than one sub-carrier.

5. The method of claim 1, wherein said field is transmitted in at least a portion of a reserved resource.

6. The method of claim 1, wherein said field is transmitted using frequency hopping.

7. The method of claim 1, wherein said field is transmitted with priority to data.

8. The method of claim 1, wherein said transmission employs an OFDMA transmission method.

9. A method comprising the steps of:
receiving in an apparatus control signaling information in a transmission time interval comprising multiple symbols;
receiving a field in the first symbol of said multiple symbols, said field indicating the size of the control signal information; and
decoding said control information in the number of symbols indicated by said field.

10. The method of claim 9, wherein said field is transmitted during each transmission time interval.

11. The method of claim 9, wherein said field is transmitted once in multiple transmission time intervals.

12. The method of claim 9, wherein said field is transmitted using frequency hopping.

13. The method of claim 9, wherein said field is transmitted with priority to data.

14. The method of claim 9, wherein said received information is transmitted using an OFDMA transmission method.

15. The method of claim 9, wherein said size is indicated by the number of symbols used to transmit said control signaling information.

16. A method, comprising the steps of:
transmitting by an apparatus control signaling information in a transmission time interval comprising multiple symbols; and
transmitting a field with a predetermined modulation and coding scheme in the first of said multiple symbols, wherein said field is transmitted in several non-contiguous sets wherein each set contains multiple sub-carriers that are contiguous.

17. A method comprising the steps of:
receiving in an apparatus control signaling information in a transmission time interval comprising multiple symbols;
receiving a field in the first symbol of said multiple symbols, said field indicating the size of the control signal information; and
decoding said control information in the number of symbols indicated by said field, wherein said field is received in several sets of non-contiguous resources wherein each set contains multiple sub-carriers that are contiguous.

* * * * *